3,759,726
KAOLIN BASED CERAMIC TILE CONTAINING GRANITE, FELDSPAR, AND HARD ALUMINA PARTICLES
William Wittels, 128 Swan Court, Chelsea, London SW. 3, England
No Drawing. Continuation-in-part of abandoned application Ser. No. 865,515, Oct. 10, 1969. This application Aug. 2, 1971, Ser. No. 168,494
Claims priority, application Great Britain, Oct. 11, 1968, 48,438/68
Int. Cl. C04b *33/00, 33/16, 35/16*
U.S. Cl. 106—45                                    7 Claims

ABSTRACT OF THE DISCLOSURE

Artificial stone tiles are produced by firing a compacted mass of granite and kaolin, containing a substantial proportion of coarse fused alumina particles to provide slip resistance. In addition the mass preferably contains fine particle size alumina and/or quartz to provide wear resistance. The compacted mass is fired for a sufficient time to effect surface melting, but not complete vitrification, of the feldspar present in the granite, which is incorporated in the mass in the form of relatively fine particles. The mass is formulated so as to include not less than 10% feldspar and not more than about 1.2% iron (calculated as iron oxide) in order to provide tiles of low water absorption and high acid resistance.

---

The present invention relates to the production of artificial stone tiles for use as flooring in buildings and other surroundings where high slip resistance is important.

This application is a continuation in part of my patent application Ser. No. 865,515 filed Oct. 10, 1969 and now abandoned.

It has already been proposed in my Pat. No. 3,360,595 to produce tiles by forming "green" shapes by compacting graded particles of granite, mixed with a small quantity of a binder, and then firing such "green" shapes at a temperature sufficiently elevated to cause surface melting of the feldspar present in the granite to bond the particles together. The surface fusion of the feldspar particles causes coherence and, after firing, the shapes have an appearance similar to, if not always identical with, the appearance of the powdered granite from which the "green" shapes were formed. All the higher melting components, such as quartz, retain their original crystalline shape.

In the case of tiles used for flooring purposes it is necessary to develop two somewhat opposed properties, namely high slip resistance and high wear resistance. Since high slip resistance depends upon the presence of local projections or peaks on the surface of the tile, it will be understood that this is deleterious to the wear resistance properties of the tile, since such projections or peaks, being formed of individual crystalline particles, are likely to be broken off or displaced.

For many applications for industrial flooring it is also important that the water absorption characteristics of the floor tiles should be low and the acid resistance should be high. In order to ensure good acid resistance properties it is essential that the iron content (measured as iron oxide) of a floor tile should be low. In a tile made by the process of the present invention the iron oxide content is held below 1.2% and is preferably below about 0.8%.

Whilst very dense tiles can be produced by firing pulverised granite at high temperature for prolonged periods, it is obviously desirable to obtain very dense tiles, which consequently have low water absorption characteristics, by employing shorter firing times. To achieve this result it is found desirable to introduce a proportion of a fine clay-like material to fill up the interstices between the relatively coarse granite particles. Because of the fact that a typical granite contains 1.5–2.0% iron (measured as iron oxide) according to one feature of the present invention Kaolin is added to a granite-based tile in amounts of 0.2–2.0 parts per part of granite. The iron oxide content of a typical kaolin is very low (below 1.0%). Kaolin is obtainable in various grades. The finest grades used in the production of porcelain command a high price. It is however possible to obtain at a lower price grades of kaolin in which 50% or more of the particles are about and even above 10 microns in size and some small proportions of the particles are even up to about 80 microns. Such coarse kaolin is found entirely satisfactory for the purpose of the present invention and is of course still relatively fine in relation to the particle size of the pulverised granite used in the process.

As in my Pat. 3,360,595 the present process relies upon effecting a surface melting of the feldspar component of the granite particles and to ensure that the tiles form a dense hard mass on firing for only sufficient time to fuse the surface of the feldspar component (without complete fusion of the feldspar particles) it is found desirable that the feldspar content of the mix should be not less than about 10%. Where the proportion of kaolin to granite is high it may be necessary to introduce some additional feldspar to ensure an adequate feldspar content. However it is in general preferred to employ 0.5–1.5 parts kaolin per part of granite and in this range the addition of feldspar is unnecessary provided the granite has been sufficiently pulverised to expose an adequate surface area of feldspar. In general it may be said that the granite should all be finer than 500 microns and is indeed preferably all finer than 150 microns.

It is an object of the present invention to product a tile having an exceptional wear resistance, with which good slip resistance may also be developed. In order to achieve the desired resistance to slip a tile made in accordance with the present invention incorporates 5–25%, preferably 5–15% of a hard crystalline alumina embedded in a fired mass composed of granite and kaolin of the nature indicated above.

At the firing temperature for the production of products which rely on the surface fusion of feldspar, i.e. at a temperature in the range of 1180°–1220° C., the very hard grades of alumina are substantially unaffected by heat. The incorporated very hard alumina thus retains its normal properties and provides exceptional wear resistance. The alumina is preferably in the form of "fused" alumina, which is prepared by comminuting a mass of alumina which has been fused and is in a crystalline state, so that the particles have sharp angular faces. The incorporation of relatively large particles of hard, sharp, crystalline alumina results in a product having excellent slip resistance, whilst wear resistance is the result of the incorporation of a substanial proportion of much finer alumina particles, i.e. below 100 microns and preferably below 70 microns. The term alumina as employed herein is directed to alumium oxide obtained by firing an aluminous mass and does not include alumina hydrates. As an alternative or additionally finely divided quartz is incorporated, this being intermediate in hardness between alumina and granite.

It will be understood that the function of the larger crystalline alumina particles is to provide slip resistance at the surface of the tile. However slip resistance will be reduced if these large particles are themselves displaced from the surface. If the surface of the tile is worn away between these particles the large alumina particles will be more rapidly lost and it is therefore desirable that the surface of the tile should be composed of hard particles which do not become displaced. The proportion of fine alumina particles assist in this wear resistance function.

However these hard grades of alumina are high-cost materials and may be replaced in whole or in part by finely divided quartz, as indicated above.

As already pointed out in my Pat. No. 3,360,595 it is essential for the purposes both of obtaining satisfactory "green" shape and of obtaining a satisfactory fired product to grade the grains of the mix in such a way that the void spaces in the "green" shapes, after compaction, are reduced below 10% and preferably below 5% of the total volume of the shape. In order to fulfil this requirement and to ensure that there is a large concentration of sharp slip resistant particles at the surface of the tile the large alumina particles should all be below 500 microns in size and more preferably should be in the size range of 200–300 microns, since such particles are found to be large enough to provide excellent slip resistance with economy in the amount of alumina employed. It may in general be said that the tile should incorporate at least 5% alumina in a particle size range of 200–500 microns to obtain the most satisfactory results. In addition it is desirable to incorporate a proportion of fine alumina, i.e. in a size range of below 70 microns, to assist in filling the void spaces between the coarse alumina particles and the granite particles and for providing wear resistance at the surface. These alumina fractions respectively preferably form 5–10% of the mix. The added quartz, which may form 5–20% of the mix, should be below 100 microns in size and is more preferably about 50 microns.

In most instances the kaolin incorporated in the mix provides sufficient plasticity, when an appropriate quantity of water is added, to permit "green" tiles of sufficient strength for convenient handling i.e. transfer from a moulding press to firing kiln, to be formed. However the process of the present invention permits tiles of great size and weight to be produced i.e. tiles up to 1 foot square and 10 pounds weight. With these larger tiles, it is convenient to add a "green strength" binder to give greater strength. A small quantity of a hydrophilic clay, such as bentonite, may be added for this purpose. An alternative expedient is to incorporate sodium silicate into the mix, either solid or in solution. The sodium silicate, after dissolution by addition of water if necessary, in the pressed "green" tiles is hardened by contact with gaseous carbon dioxide. Many other forms of green strength binder, such as starch, may be incorporated. However it must be emphasised that provided sufficient care is exercised in removing the green shapes from the press mould, no green strength binder other than the kaolin is required.

EXAMPLE I

A mix was made up from the following components:

| Component | Parts | Particle size (in microns) | Iron oxide content, percent |
|---|---|---|---|
| Granite | 100 | 125 | 1.6 |
| Kaolin | 100 | 10 (50%) | 0.6 |
| Quartz | 40 | 50 | Negligible |
| "Fused" alumina (coarse) | 15 | 300–400 | 1.0 |
| "Fused" alumina (fine) | 15 | 70 | 1.0 |
| Bentonite | 6 | | |
| Water | 25 | | |

This mixture was moulded into "green" shapes. These green shapes are then thoroughly dried and fired, utilising the procedure set out below. The tiles produced by the use of this example exhibit a hard metallic sound when struck.

The mixture above stated is supplied in appropriate quantities to moulds 1 foot square to provide a final thickness of ½ to 1 inch and was subjected to a pressure in excess of ½ ton p.s.i. to form it into "green" tiles. The "green" shapes in this example are fired at a temperature of 1200° C. It is undesirable to employ a firing temperature above 1220° C. The firing procedure preferably employed involves raising the temperature of the tiles to the firing temperature at a rate of about 120° C. per hour. The maximum firing temperature is maintained for a relatively short period of about 2 hours and then the tiles are cooled down to a temperature of not more than 200° C. in 10 hours and then are removed from the kiln. Preferably the process is operated so that one batch of tiles is fired in a 24 hour period. The firing cycle thus extends over less than a 24 hour period. By holding the tiles at the firing temperature of 1200° C. for 2 hours the feldspar in the granite is melted at its surface to bond the mix into a coherent tile. It is emphasised that it is neither necessary nor desirable to effect complete vitrification of the feldspar. The drying, heating and cooling procedures prevent thermal shock and cracking of the tiles.

The tiles produced by this procedure had the following properties:

Water absorption on boiling for 2 hours __percent__ 2.2
Acid resistance (as measured by British Standard Specification 784 "Methods of Test of Chemical Stoneware") _____do____ 99.8
Resistance to abrasion (as measured by British Standard Specification 1902: Part 1A "Method of Testing Refractory Materials") _____ 30

The granite referred to in the above example contained about 30% plagioclase and 6% orthoclase feldspars, the remainder being about 45% quartz and 18% mica.

The granite particles had the following composition, determined on an oxide basis:

Silica _____ 72.84
Alumina _____ 16.25
Ferric oxide _____ 0.14
Lime _____ 1.10
Ferrous oxide _____ 1.49
Magnesia _____ 0.55
Sodium oxide _____ 2.25
Potassium oxide _____ 5.19
Moisture and loss on ignition _____ 0.63

EXAMPLE II

In this example the same materials and particle sizes were employed as in Example I, also employing the same pressing and firing procedures. Satisfactory tiles were produced by varying the relative proportions of material as indicated below.

| | Quantity (parts by weight) | | | | | | | | |
|---|---|---|---|---|---|---|---|---|---|
| | a | b | c | d | e | f | g | h | h | i |
| Granite | 100 | 95 | 90 | 80 | 75 | 70 | 65 | 105 | 105 | 120 |
| Kaolin | 100 | 105 | 110 | 120 | 125 | 130 | 135 | 135 | 135 | 80 |
| Quartz | 40 | 40 | 40 | 40 | 40 | 40 | 40 | | | 40 |
| Alumina (coarse) | 15 | 15 | 15 | 15 | 15 | 15 | 15 | 15 | 18 | 15 |
| Alumina (fine) | 15 | 15 | 15 | 15 | 15 | 15 | 15 | 15 | 12 | 15 |
| Bentonite | 5 | | | | | | | | | |
| Water | 15 | 15 | 15 | 15 | 15 | 15 | 15 | 15 | 15 | 15 |

EXAMPLE III

In this example the same materials and particle sizes and the same parts by weight were employed as in Example II(a) except that the bentonite was replaced by 7.5 parts by weight sodium silicate powder. After pressing the green tiles were gassed by diffusion of carbon dioxide gas for several seconds. This gave improved green strength. The green tiles were then fired by the above described procedure.

Whatever the precise size of the particles utilised, the mix must be graded so as to provide "green" tiles having very low void spaces when subjected to pressures of about ½–5 tons p.s.i. The granite particles utilised for the process are preferably obtained from the pulverised granite waste to be found in any granite quarry. This material is preferably subjected to a sieving operation so as to remove all particles which do not pass a 150 micron mesh sieve. As already explained this provides a high surface area of feldspar in the mass. The sieved granite particles are substantially above 50 microns on average. Where additional feldspar is incorporated in the mix, this is added in the most finely divided form readily obtainable. The particle size selected for added feldspar is preferably below 125 microns. The added quartz, which is provided for the improvement of wear resistance, is preferably very fine and below 50 microns in size.

The tiles produced in accordance with these examples have a low moisture absorption value. They provide both a good wear resistance and a good slip resistance. They are thus very suitable for use as floor and paving tiles and the like. The appearance of all tiles made in accordance with the present invention can be modified by the addition of so-called "body colour" without substantial change in the properties of the fired tile.

In the process of the present invention the desired surface melting of the feldspar may be achieved at a somewhat lower temperature than the above mentioned range of 1180°–1220° C. by the addition of a flux. The firing temperature may be depressed by up to 50° C. by the incorporation of about 5% sodium chloride. However this is not generally desirable since it may lead to some deterioration in the physical properties of the tile and may in addition result in some emission of hydrochloric acid gas from the firing oven.

All parts and percentages stated herein are by weight.

What I claim is:

1. A process for the production of flooring tiles which comprises forming a mix consisting essentially of granite, kaolin in an amount of 0.2–2.0 parts per part of granite and alumina in an amount of 5–25% by weight, said granite consisting of particles of below 500 microns in size and said alumina providing at least 5% by weight of crystalline particles in the range of 200–500 microns and 5–10% of hard alumina particles having a particle size of below 100 microns, said mix comprising not less than about 10% by weight of feldspar and not more than about 1.2% by weight of iron, calculated as iron oxide, pressing said mix into dense, firm "green" shapes and firing said "green" shapes for a time and at a temperature sufficient to cause sufficient surface fusion of the feldspar to bond the particles in the mix into a firm dense tile without complete vitrification of the feldspar.

2. A process according to claim 1 wherein said mix further contains 5–15% by weight of quartz having a particle size finer than 100 microns.

3. A process according to claim 2 wherein kaolin is present in the mix in an amount of 0.5–1.5 parts per part of granite.

4. A process according to claim 3 wherein the particle size of the granite is below 150 microns and above 50 microns.

5. A process according to claim 4 in which the relative proportions of granite, kaolin and quartz in the mix are 100:100:40.

6. A process according to claim 2 in which the alumina content of the mix is comprised of 5–10% particles in the size range of 300–400 microns and 5–10% particles below 70 microns in size, the said percentages being calculated on the total solids contents of the mix.

7. A floor tile composed essentially of a fired mass of granite particles of a size of below 500 microns, kaolin in an amount of 0.2–2.0 parts per part of granite and alumina in an amount of 5–25% by weight of said mass, said alumina containing at least 5% by weight of fused alumina particles in the size range of 200–500 microns and 5–10% of hard alumina particles having a particle size of below 100 microns, the components of said mass comprising not less than about 10% by weight of feldspar and not more than about 1.2% by weight of iron, calculated as iron oxide, the particles in said mass being bonded together by fused feldspar without complete vitrification of the feldspar.

References Cited

FOREIGN PATENTS

| | | | |
|---|---|---|---|
| 619,061 | 3/1949 | Great Britain | 264—56 |
| 1,086,581 | 10/1967 | Great Britain | 264—56 |
| 1,111,974 | 5/1968 | Great Britain | 264—56 |

JOHN H. MILLER, Primary Exminer

U.S. Cl. X.R.

106—65, 67, 68; 264—56